United States Patent
Park

(10) Patent No.: US 7,969,688 B2
(45) Date of Patent: *Jun. 28, 2011

(54) METHOD AND APPARATUS SUPPORTING A SLIDER HAVING MULTIPLE DEFLECTION RAILS IN A NEGATIVE PRESSURE POCKET FOR A HARD DISK DRIVE

(75) Inventor: Ki-Ook Park, Dublin, CA (US)

(73) Assignee: Samsung Electronics Co., Ltd., Suwon, Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/012,255

(22) Filed: Jan. 31, 2008

(65) Prior Publication Data
US 2008/0130173 A1    Jun. 5, 2008

Related U.S. Application Data

(62) Division of application No. 10/810,395, filed on Mar. 26, 2004, now Pat. No. 7,333,297.

(51) Int. Cl.
*G11B 5/60* (2006.01)
(52) U.S. Cl. .................. 360/235.5; 360/236.3
(58) Field of Classification Search ............. 360/235.5, 360/236.3, 236.2, 236.9, 237
See application file for complete search history.

(56) References Cited

U.S. PATENT DOCUMENTS

| | | | | |
|---|---|---|---|---|
| 6,055,127 A * | 4/2000 | Boutaghou et al. | ........... | 360/236 |
| 6,603,639 B1 * | 8/2003 | Polycarpou et al. | ....... | 360/235.8 |
| 6,879,464 B2 * | 4/2005 | Sun et al. | ................. | 360/236.3 |
| 6,934,122 B2 * | 8/2005 | Boutaghou et al. | ........ | 360/235.5 |
| 7,149,056 B2 * | 12/2006 | Kameyama | ................ | 360/235.5 |
| 2002/0030938 A1 * | 3/2002 | Boutaghou et al. | ........ | 360/236.3 |
| 2002/0135941 A1 * | 9/2002 | Kohira et al. | .............. | 360/235.5 |
| 2003/0206374 A1 * | 11/2003 | Ueda et al. | ................. | 360/236.3 |
| 2005/0128642 A1 * | 6/2005 | Weiss et al. | ............... | 360/234.6 |

* cited by examiner

*Primary Examiner* — Jefferson Evans

(57) ABSTRACT

An air bearing surface, with multiple deflection rails in a negative pressure pocket, between a leading air bearing surface and a central island for the read-write head. A gap separates left and right deflection rails. During the slider's normal operation, incoming particles may collide with at least one of the deflection rails and deflect away from the central island and the read-write head. The gap supports diminishing additional negative pressure in the negative air pressure pocket. The gap may minimize the accumulation of debris behind the rejection rails. The invention includes head gimbal assemblies containing these sliders, actuator arms coupled to the head gimbal assemblies, actuator assemblies including at least one of the actuator arms, and hard disk drives which include the actuator assemblies. The invention also includes methods for making sliders, actuator arms, actuator assemblies, and hard disk drives, as well as the products of these manufacturing methods.

7 Claims, 9 Drawing Sheets

METHOD AND APPARATUS SUPPORTING A SLIDER HAVING MULTIPLE DEFLECTION RAILS IN A NEGATIVE PRESSURE POCKET FOR A HARD DISK DRIVE

CROSS REFERENCE TO RELATED PATENT APPLICATIONS

This application is a divisional of U.S. patent application Ser. No. 10/810,395 filed Mar. 26, 2004, now U.S. Pat. No. 7,333,297 which is incorporated herein in its entirety.

BACKGROUND OF THE INVENTION

1. Field of the Invention

This invention relates to sliders for hard disk drives, and more particularly to self-loading negative pressure air bearing sliders for use with rotary actuators.

2. Background Information

The read-write head is embedded in a slider. The slider floats on a thin air bearing a very short distance above the rotating disk surface. Typically, the slider has a trailing end in which the read-write head is mounted.

Disk rotation drags air under the slider. The air bearing is generated between the flying slider and the rotating disk. The skin friction on the air bearing surface of the slider creates an aerodynamic lifting force. This causes the slider to lift and fly above the disk surface. Today, most conventional sliders include a sub-ambient pressure region around slider centroid. This sub-ambient pressure zone develops negative pressure that counteracts the aerodynamic lifting force developed along the air bearing surface. These lifting and sub-ambient forces combine to stabilize slider's flying environment.

In the hard disk drive industry, there is a continuous economic incentive for greater bit density on the disk surfaces. This places a strong emphasis on extremely narrow flying gaps between sliders and the rotating disk surfaces over which they fly.

Today, many hard disk drives employ sliders designed to operate at some level of interference between the slider and the contaminating particles found on or near the rotating disk surface.

Because current conventional sliders fly very close to the disk surface, the particle contamination between the slider and the rotating disk surface is a serious problem, affecting the reliability of data access operations.

Because of the small size of these particles, they can easily be taken up into the air flow. They flow along with the main air stream, interacting with the slider and the rotating disk interface. The particles tend to accumulate on the slider surface, often changing the characteristics of the slider to rotating disk surface interface. This tends to destabilize how the slider flies over the rotating disk surface, and may cause abrasion on the disk surface. The abrasion may result from scratches on the disks, embedding some of these particles in the rotating disk surface. Both of these effects can seriously reduce the operational reliability of the hard disk drive.

While it would be best if there were no floating particles inside of the hard disk drive, it is not possible to make an economical, completely clean, hard disk drive. Additionally, normal operation of a hard disk drive may generate new particles.

What is needed is substantial reduction of contamination of the slider-rotating disk surface interface by safely rejecting these floating particles between the flying slider and the rotating disk, especially around the read-write head.

What is needed is a flying head slider experiencing less failure from particle contamination, in particular less abrasive wear and fewer disk surface scratches.

Magnetic spacing modulation refers to modulations in the magnetic field between the read-write head and a track being accessed on the rotating disk surface. These modulations result from collisions of particles with the slider, which causes the flying height to vary. A slider is needed, with less magnetic spacing modulation and improved stability in its flying over the rotating disk surface.

BRIEF SUMMARY OF THE INVENTION

The invention includes an air bearing surface for a slider. The air bearing surface contains at least two deflection rails between a leading air bearing surface and a central island containing the read-write head. A gap separates the left and right deflection rails.

During the slider's normal operation, incoming particles may collide with at least one of the deflection rails and deflect away from the central island and the read-write head. These deflection rails substantially reduce particle contamination problems at the interface of the slider with the rotating disk surface. This interface directly affects the reliability of the read-write head in accessing tracks on the rotating disk surface.

The gap supports means for diminishing additional negative pressure in the negative air pressure pocket. The gap may minimize the accumulation of debris behind the rejection rails.

The invention includes the head gimbal assemblies including these sliders, the actuator arms coupled to the head gimbal assemblies, the actuator assemblies including at least one of the actuator arms, and the hard disk drives including the actuator assemblies. The invention also includes methods making the sliders, the actuator arms, the actuator assemblies, and the hard disk drives. The invention includes the products of these manufacturing methods.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, in which:

DESCRIPTION OF THE PREFERRED EMBODIMENTS

Figure 1A:
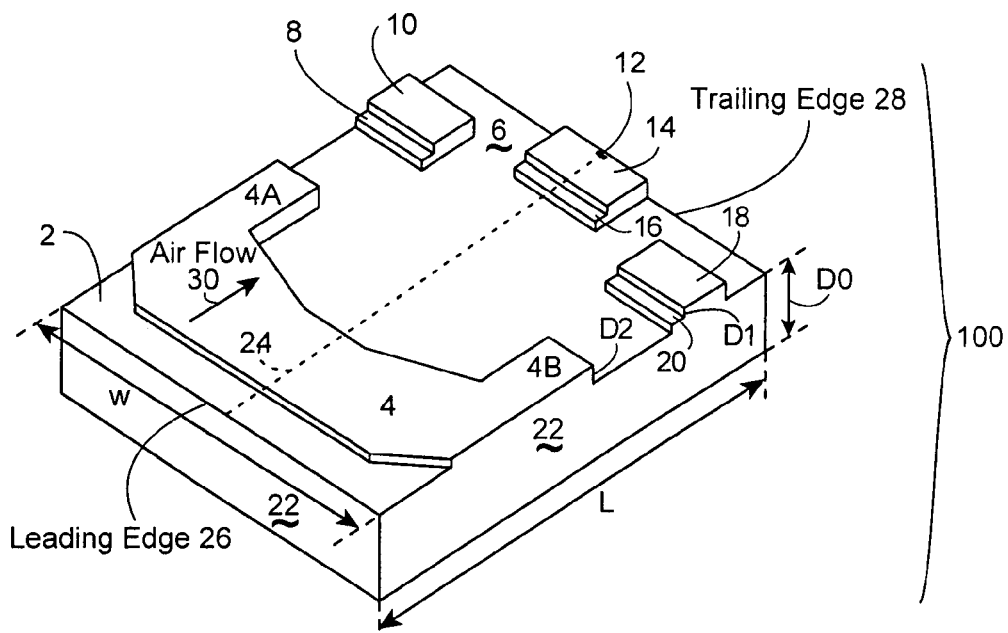
FIG. 1A is a perspective view of the conventional slider supporting a negative pressure air bearing when flying above a rotating disk surface.

The following description is provided to enable any person skilled in the art to make and use the invention and sets forth the best modes presently contemplated by the inventors for carrying out the invention. Various modifications, however, will remain readily apparent to those skilled in the art, since the generic principles of the present invention have been defined herein.

Table One of named elements, reference numbers and Figures.

| Named element | Reference | Figures |
|---|---|---|
| Leading edge step | 2 | 1A to 7A |
| Leading air bearing surface | 4 | 1A to 5 |
| Left leading air bearing arm | 4A | 1A, 2A to 5 |
| Right leading air bearing arm | 4B | 1A, 2A to 5 |
| Negative pressure pocket | 6 | 1A to 7B |
| Left island ledge | 8 | 1A to 5, 7A, 7B |
| Left island | 10 | 1A to 5, 7A, 7B |
| Read-write head | 12 | 1A to 5, 7A to 7C, 9B |
| Central island | 14 | 1A to 5, 7A, 7B |
| Central island ledge | 16 | 1A to 5, 7A, 7B |
| Right island | 18 | 1A to 5, 7A, 7B |
| Right island ledge | 20 | 1A to 5, 7A, 7B |
| Leading face of slider | 22 | 1A, 2A |
| Principle axis | 24 | 1A, 2A, 3A, 4A, 5, 9B |
| Leading edge | 26 | 1A to 5, 7A, 7B |
| Trailing edge | 28 | 1A to 5, 7A, 7B |
| Air flow | 30 | 1A to 2A |
| Left deflection rail | 50 | 2A to 7B |
| Left deflection front face | 50A | 2A to 5, 7B |
| Left deflection back face | 50B | 2A, 3A, 4A, 5 |
| Left deflection rail length | 52 | 3A |
| Left deflection rail height | 54 | 2A |
| Left deflection rail angle | 56 | 2A, 3A, 4A, 5 |
| Left deflection rail width | 58 | 2A, 3A, 4A |
| Central deflection rail | 60 | 5, 6A, 7A, 7B |
| Central deflection rail right front face | 60A | 5, 7A, 7B |
| Central deflection rail left front face | 60B | 5, 7A, 7B |
| Central deflection rail back face | 60C | 5 |
| Central deflection rail right angle | 66A | 5 |
| Central deflection rail left angle | 66B | 5 |
| Right deflection rail | 70 | 2A to 7B |
| Right deflection front face | 70A | 2A to 3B, 5, 7B |
| Right deflection front face left part | 70A1 | 4A, 4B |
| Right deflection front face right part | 70A2 | 4A, 4B |
| Right deflection back face | 70B | 2A, 3A 4A, 5 |
| Right deflection back face left part | 70B1 | 4A, 4B |
| Right deflection back face right part | 70B2 | 4A, 4B |
| Right deflection rail length | 72 | 3A |
| Right deflection rail height | 74 | 2A |
| Right deflection rail angle | 76 | 2A, 3A, 4A, 5 |
| Right deflection rail width | 78 | 2A, 3A, 4A, 5 |
| Air current into gap G1 between rails | 82A | 2B, 3B, 4B |
| Air current through gap G1 between rails | 82A1 | 2B, 3B, 4B |
| Air current into rail and left rail gap G2 | 88A2 | 7A |
| Air current into from rail and left rail gap G3 | 88B2 | 7A |
| Left air current through rail gap G1 | 88C | 7A |
| Right air current through rail gap G1 | 88D | 7A |
| Left deflection rail incoming particle | 90A | 2B, 3B, 4B, 7B |
| Left deflection rail deflected particle | 90B | 2B, 3B, 4B, 7B |
| Right deflection rail incoming particle | 92A | 2B, 3B, 4B, 7B |
| Right deflection rail deflected particle | 92B | 2B, 3B, 4B, 7B |
| Left side incoming particle | 94A | 7B |
| Left side deflected particle | 94B | 7B |
| Right side incoming particle | 96A | 7B |
| Right side deflected particle | 96B | 7B |
| Air bearing surface of slider | 100 | 1A to 5, 7C |
| Slider | 102 | 1A, 2A, 7C, 9B |
| Micro-actuator | 104 | 7C, 9B |
| Flexure | 106 | 7C |
| Hard disk drive | 110 | 8 to 10 |
| Disk base plate | 112 | 9A to 10 |
| Voice coil | 114 | 8 to 9B |
| Actuator pivot | 116 | 8 to 9B |
| Voice coil motor assembly | 118 | 8, 9A, 10 |
| Yolk top plate | 120 | 8, 9A |
| Yolk bottom plate | 122 | 8 |
| Load beam | 130 | 7C |
| Actuator arm | 150 | 8 to 9B |
| . . . | 152, 154, 156 | 8 |
| Actuator assembly | 158 | 8, 9B |
| Head gimbal assembly | 160 | 7C to 9B |
| . . . | 162, 164, 166 | 8 |
| Axis of disk rotation | 168 | 8 to 9B |
| Spindle motor | 170 | 10 |

-continued

Table One of named elements, reference numbers and Figures.

| Named element | Reference | Figures |
|---|---|---|
| Disk spacer | 172 | 10 |
| Disk Clamp | 174 | 10 |
| Spindle motor hub | 178 | 10 |
| Disk, First | 180 | 1B, 8, 9A to 10 |
| Disk, Second | 182 | 10 |
| Printed circuit board | 184 | 10 |
| Main flex circuit | 186 | 9A |
| Flex circuit | 188 | 8, 9A |
| Track | 190 | 9B |
| Inside Diameter | 192 | 9B |
| Outside Diameter | 194 | 9B |
| Preamplifier | 198 | 8 |
| Flex connector | 200 | 8 |
| Disk top plate | 210 | 10 |
| Second left deflection rail | 250 | 6A to 6D |
| Second right deflection rail | 270 | 6A to 6D |
| Finished depth of slider 102 | D0 | 1A, 2A |
| Depth of island ledge 20 | D1 | 1A, 2A |
| Depth of leading air bearing surface 4 | D2 | 1A, 2A |
| Distance between air bearing surface 100 and the rotating disk 180 surface | D3 | 1B |
| First Gap from left deflection to right deflection rail | G1 | 2A, 3A, 4A, 5 to 6D |
| Second Gap from right deflection rail to central rail | G2 | 5, 6A |
| Third Gap from left deflection rail to central rail | G3 | 5, 6A |
| Fourth Gap between second left deflection rail 250 and left deflection rail 50 | G4 | 6A to 6D |
| Fifth Gap between second right deflection rail 270 and right deflection rail 70 | G5 | 6A to 6C |

Figure 1B:
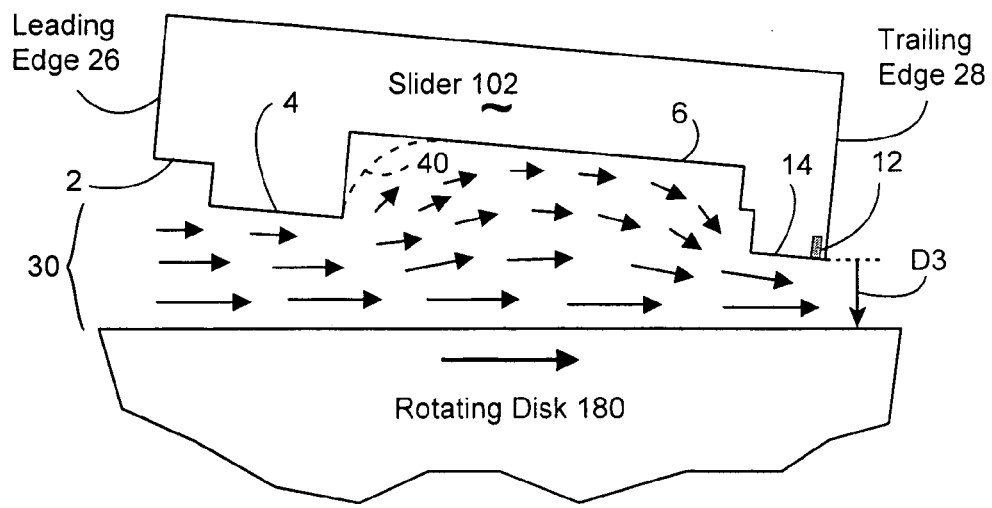
FIG. 1B is a side view of a conventional slider flying over rotating disk.

FIG. 1A is a perspective view of the conventional slider supporting a negative pressure air bearing when flying above a rotating disk surface. FIG. 1B is a side view of the conventional slider 102 flying over a rotating disk 180.

In FIGS. 1A and 1B, slider 102 possesses a negative pressure air bearing formed by the air bearing surface 100 interacting with the rotating disk 180. The force causing the slider to fly is due to the rotation of the disk 180 surface below the slider 102. The disk rotation creates a wind providing a lifting force between a leading air bearing surface 4 and a trailing air bearing surface 28. The trailing air bearing surface is part of a central island 14, which includes a read-write head 12. The overall configuration generates a downside force at negative pressure pocket 6. Interaction between the lifting and downside forces reduces the flying height sensitivity with respect to disk velocity as well as increases air bearing stiffness. The leading edge flying height being higher than the trailing edge flying height provides a pitch angle which stabilizes slider flying. However, this pitch angle allows incoming particles to easily pass the leading edge 4, to be squeezed and embedded in the disk surface, or damage the read-write head 12, while passing the trailing edge 14.

The air flow driven by disk rotation under a slider air bearing surface as in FIGS. 1A and 1B. The air flow is squeezed at leading edge step 4. The slider lifting force is generated from air passing the leading air bearing surface, which includes 4, 4A, and 4B. The squeezed air is rapidly expanded and retarded at negative pressure pocket 6, generating a sub-ambient pressure at the pocket 6, which pulls down the slider. As air passes the trailing edge, it is squeezed between trailing air bearing surface 10, 14, and 22. This generates a positive push-up force acting upon the slider 102.

As in FIG. 1B, the air flow in the negative pressure pocket 6 includes an upside expansion with drastically retarded flow speed. During this air expansion in the zone 6, many incoming particles tend to float in the air flow, creating a debris accumulation zone 40. Additionally, particles which are lifted into the air flow, may actually concentrate near the principal axis 24, and stand a high chance of colliding with the central island 14, possibly even colliding with the read write head 12. Particle collisions with the read-write head 12 may damage its reliability. In the following discussion, because of laminar flow characteristics, air streamlines between the invention's slider air bearing surface 100 and the rotating disk 180 may be mostly parallel.

Figure 2A:
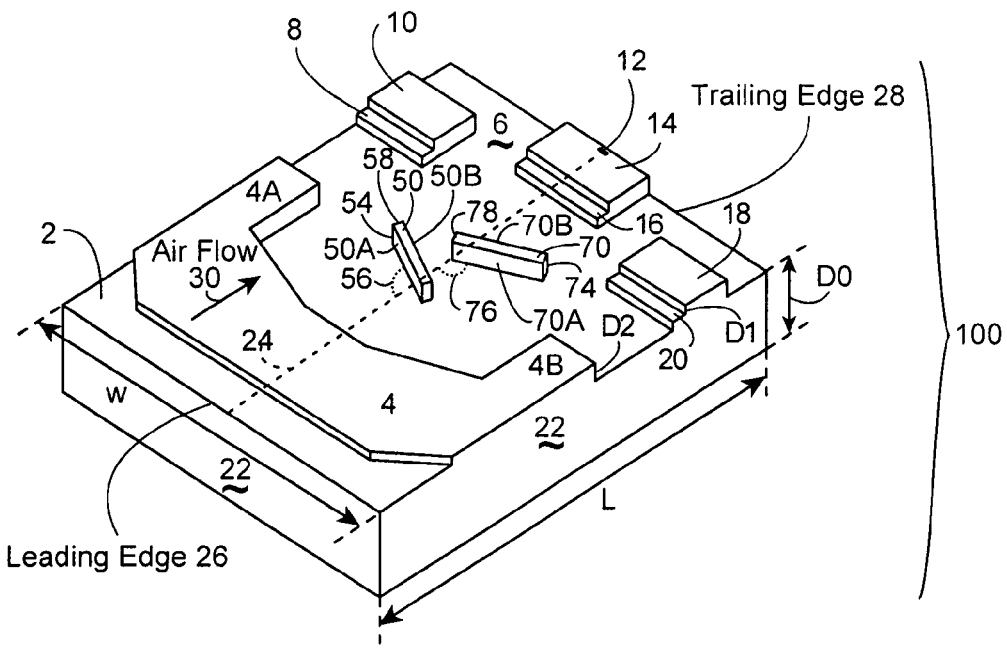
FIG. 2A is a perspective view of one embodiment of a slider air bearing surface containing a left deflection rail in front of a right deflection rail in the negative pressure pocket.
Figure 2B:
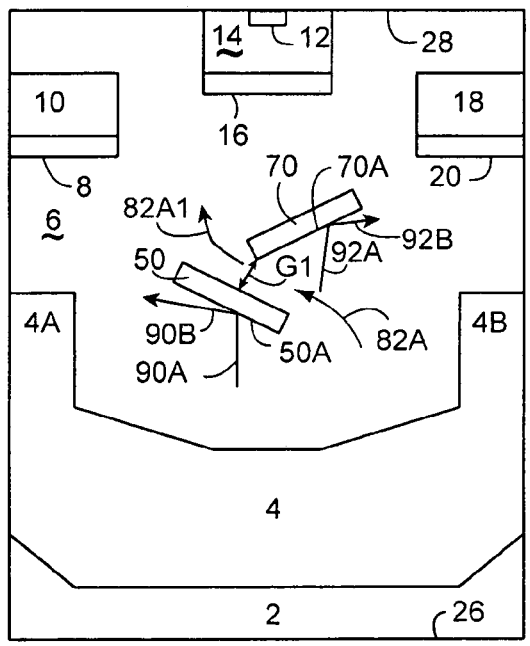
FIG. 2B shows a bottom view of the slider air bearing surface of FIG. 2A.

FIG. 2A is a perspective view of one embodiment of a slider air bearing surface 100 utilizing a left deflection rail 50 and a right deflection rail 70 in the negative pressure pocket 6. FIG. 2B shows a bottom view of the slider air bearing surface 100 of FIG. 2A. The left deflection rail 50 is in front of the right deflection rail 70. As used herein, a first rail is in front of a second rail whenever some part of the first rail is closer to the leading edge 26 than any part of the second rail.

Figure 3A:
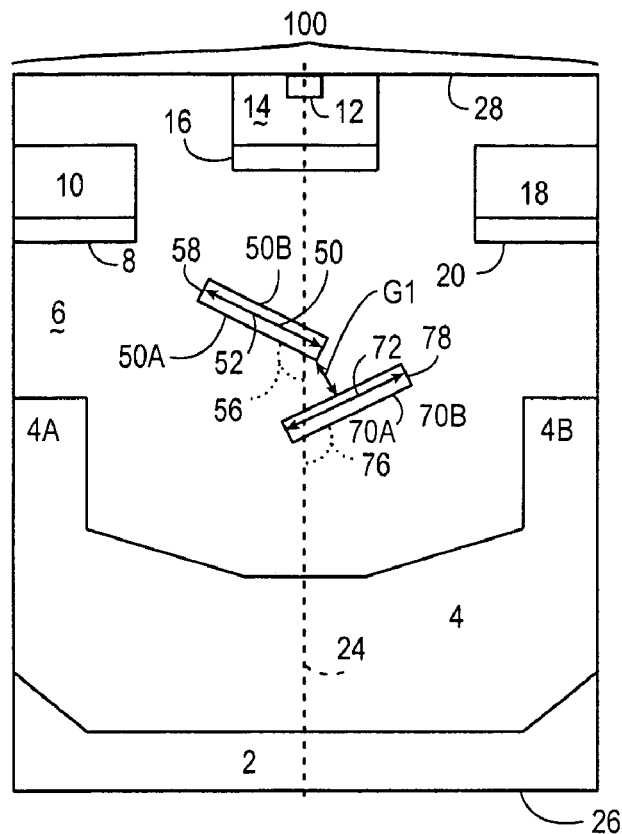
FIGS. 3A and 3B show bottom views of an embodiment of a slider air bearing surface containing a right deflection rail in front of a left deflection rail in the negative pressure pocket.
Figure 3B:
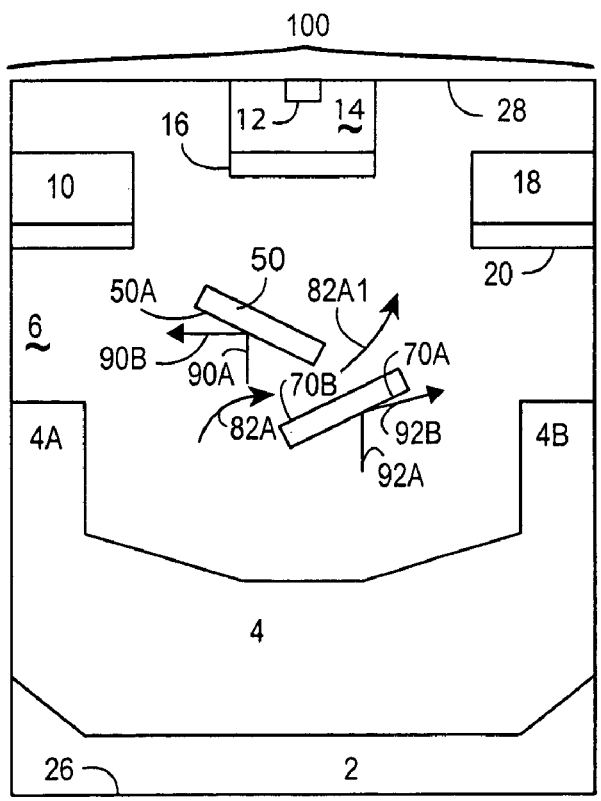

FIGS. 3A and 3B show bottom views of another embodiment of the slider air bearing surface 100 utilizing a right deflection rail 70 in front of a left deflection rail 50 in the negative pressure pocket 6.

Figure 4A:
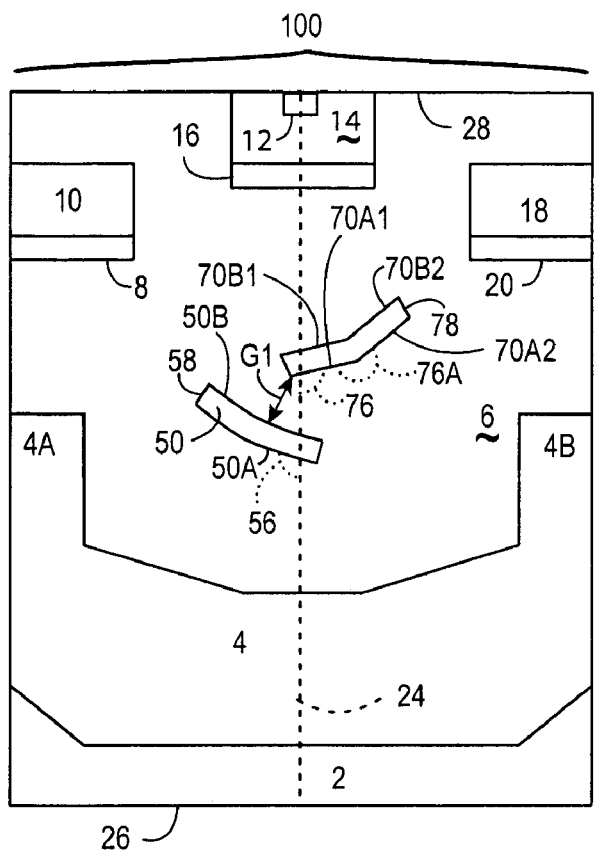
FIGS. 4A and 4B show bottom views of another embodiment of a slider air bearing surface utilizing a curved left deflection rail in front of a bent right deflection rail in the negative pressure pocket.
Figure 4B:
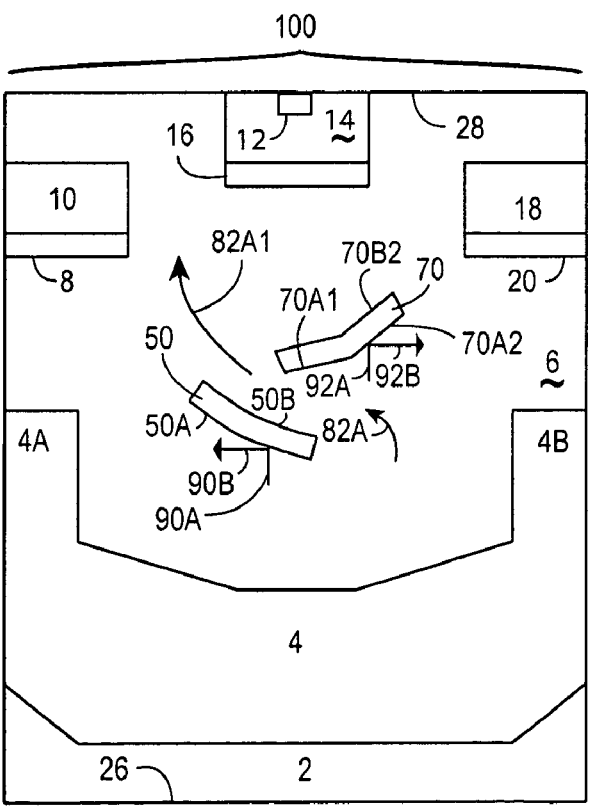

FIGS. 4A and 4B show bottom views of another embodiment of a slider air bearing surface 100 utilizing a left deflection rail 50 in front of a right deflection rail 70 in the negative pressure pocket 6. The left deflection rail 50 curves. The right deflection rail 70 is bent.

Figure 5:
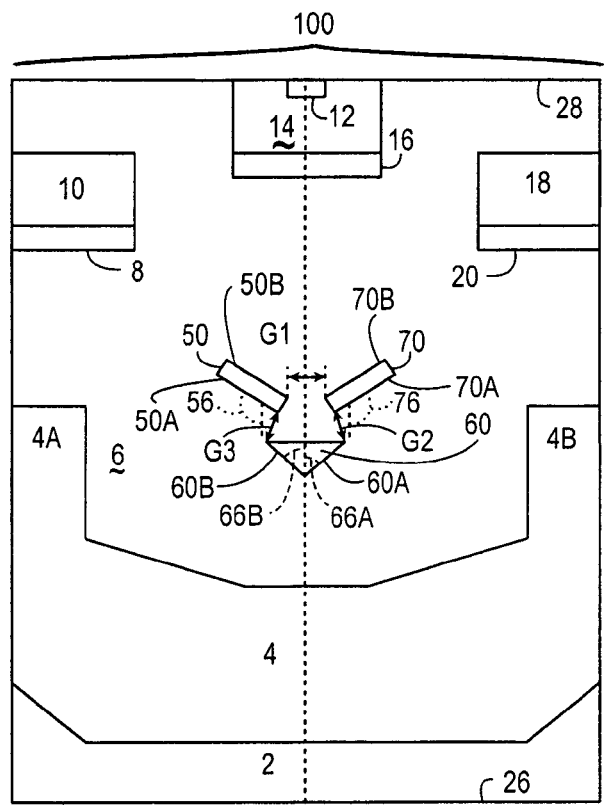
FIG. 5 shows a bottom view of another embodiment of a slider air bearing surface utilizing a central deflection rail, a left deflection rail and a right deflection rail in the negative pressure pocket.
Figure 7A:
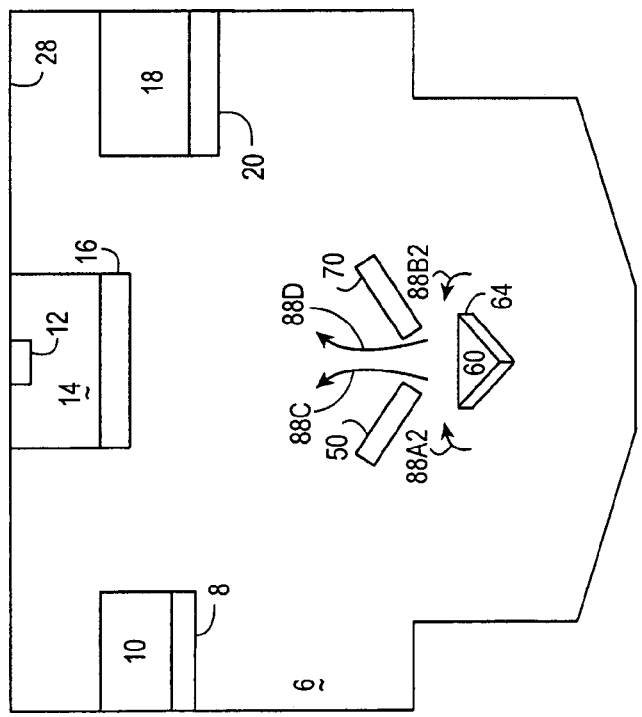
FIGS. 7A and 7B shows details of the operation of the slider air bearing surface of FIG. 5.
Figure 7B:
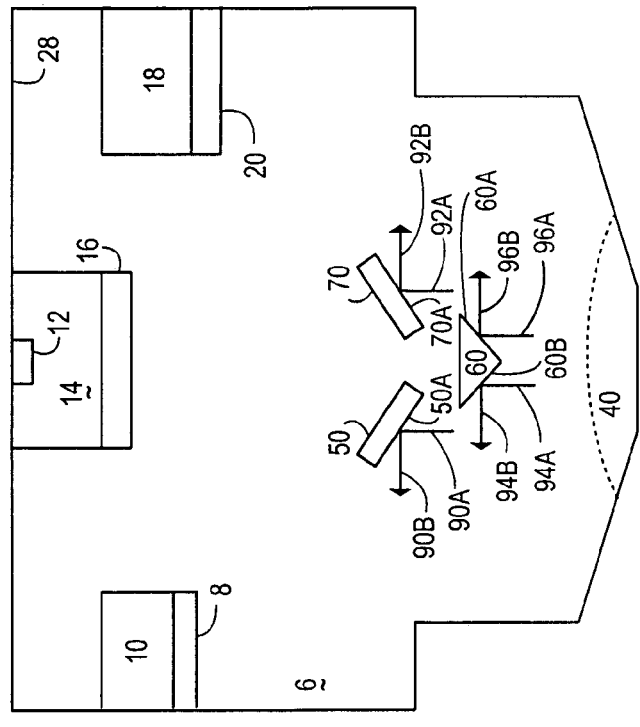

FIG. 5 shows a bottom view of another embodiment of a slider air bearing surface 100 utilizing a central deflection rail 60, a left deflection rail 50 and a right deflection rail 70 in the negative pressure pocket 6. FIGS. 7A and 7B show details of the operation of the slider air bearing surface 100 of FIG. 5. The left deflection rail 50 is essentially as close to the leading air surface 4 as the right deflection rail 70.

The central deflection rail 60 is in front of the left deflection rail 50 and the right deflection rail 70. It may be preferred that the left deflection rail 50 and the right deflection rail 70 mirror each other about the principal axis 24.

In FIGS. 2A, 2B, 3A, 3B, 4A, 4B, 5, 7A, and 7B, the left deflection rail 50 includes a left deflection front face 50A and a left deflection back face 50B. The left deflection rail width 58 is essentially the distance between these two faces 50A and 50B. The left deflection rail 50 has a length 52, arranged at an angle 56 with respect to the principle axis.

In FIGS. 2A, 2B, 3A, 3B, 5, 7A, and 7B, the right deflection rail 70 includes a right deflection front face 70A and a right deflection back face 70B. The right deflection rail width 78 is essentially the distance between these two faces 70A and 70B. The right deflection rail 70 had a length 72, arranged at an angle 76 with respect to the principle axis.

In FIGS. 2A, 2B, 3A, and 4A, the right deflection rail 70 extends on both the left and right side of the principal axis 24. The left deflection rail 50 extends on both the left and right side of the principal axis 24.

In FIG. 5, the left deflection rail 50 extends only on the left side of the principal axis 24. The right deflection rail 70 extends only on the right side of the principal axis 24. The left deflection rail 50 extends only on the left side of the principal axis 24.

In FIGS. 2A, 2B, 3A, 3B, 4A and 4B, the left deflection rail 50 and right deflection rail 70 collectively form a deflection barrier. In FIGS. 5, 7A, and 7B, the left deflection rail 50, the central deflection rail 60, and the right deflection rail 70 collectively form the deflection barrier. It may be preferred that the deflection barrier extends as far to the left of the principal axis as it extends to the right.

FIG. 2B shows the operation of the air bearing surface 100 of FIG. 2A.

FIG. 3B shows the operation of the air bearing surface 100 of FIG. 3A.

FIG. 4B shows the operation of the air bearing surface 100 of FIG. 4A.

FIGS. 7A and 7B show the operation of the air bearing surface 100 of FIG. 5.

In FIGS. 2B, 3B, 4B, and 7B, an incoming particle 90A may hit the left deflection rail 50, deflecting in a path 90B away from the central island, which includes 14 and 16. An incoming particle 92A may also hit the right deflection rail 70, deflecting in a path 92B away from the central island 14 and 16.

In FIG. 7B, an incoming particle 94A may hit the central deflection rail left front face 60B, deflecting in a path 94B away from the central island, which may include 14 and/or 16. An incoming particle 96A may hit the central deflection rail right front face 60A, deflecting in a path 96B away from the central island.

The central island carries the read-write head 12. As shown in FIG. 1B, the central island is the region of the air bearing surface 100 which has the narrowest distance from the rotating disk surface, which is labeled D3. If a particle passes near enough to the read-write head 12 while it is accessing a track 190 on the rotating disk 180 surface, as in FIG. 9B, one or more access errors may occur. A particle colliding with one of the deflection rails 50 and 70 tends to be deflected away from the read-write head 12, which tends to increase the overall reliability of the data access operations of the hard disk drive 110.

The invention uses a first gap separating the left deflection rail 50 from the right deflection rail 70 as shown in FIGS. 2A to 7B. The first gap is labeled G1 in FIGS. 2A, 3A, 4A, and 5 to 6D.

In FIGS. 2B, 3B, and 4B, the arrow 82A represents the air current going into the first gap G1 between the deflection rails 50 and 70. In these Figures, the arrow 82A1 represents the air current going through the gap G1, which tends to minimize the accumulation of debris behind the deflection rails 50 and 70.

In FIG. 7A, there are two additional gaps in front of the first gap G1 between the deflection rails 50 and 70. The arrow 88A2 represents the current of air entering the gap G2, labeled in FIG. 5, between the central deflection rail 60 and the left deflection rail 50. This air current predominantly feeds the air current 88C going through the first gap G1. The arrow 88B2 represents the current of air entering the gap G3, labeled in FIG. 5, between the central deflection rail 60 and the right deflection rail 70. This air current predominantly feeds the air current 88D going through the deflection rail gap G1. The air currents 88C and 88D tend to minimize negative pressure and the accumulation of debris behind the deflection rails 50 and 70. These gaps and air currents also tend to minimize the accumulation of debris behind the central deflection rail 60.

The invention provides a means for removing debris behind the leading air bearing surface, which includes 4, 4A and 4B. This may occur as a consequence of the interaction of the negative pressure pocket 6 with the deflection rails 50 and 70 in FIGS. 2B, 3B, and 4B. In FIG. 7A, the consequences may include the interaction of the negative pressure pocket 6 with the central deflection rail 60, the left deflection rail 50, and the right deflection rail 70. These interactions with the leading air bearing surface 4 may further include interactions with the left leading air bearing arm 4A and with the right leading air bearing arm 4B.

FIG. 2A shows the height 54 of the left deflection rail 50 and the height 74 of the right deflection rail 70. The depth of the leading air bearing surface 4 is shown as D2. The discussion of these heights may apply to each embodiment of the invention. The height 64 of the central deflection rail 60 is shown in FIG. 7A. Typically, height of the islands 10, 14, and 18 is essentially equal to as the depth D2 of the leading air bearing surface 4. The height of the ledges 8, 16 and 20 are essentially equal to, D2 minus D1.

The left deflection rail height 54 and the right deflection rail height 74 both support avoiding contact with the rotating disk 180 surface. These deflection rail heights also avoid contact with the disk 180 surface when the disk drive 110 parks the actuator assembly 158. Parking the actuator assembly 158 entails either placing the head gimbal assemblies 160 to 166 near the outside diameter 194, or placing the head gimbal assemblies 160 to 166 near the inside diameter 192. Hard disk drives 110 parking the head gimbal assemblies 160 to 166 near the inside diameter 192 will be referred to herein as Crash Start/Stop (CSS) hard disk drives. This term and the invention applies to hard disk drives 110 which include at least one head gimbal assembly 160. The central deflection rail 60 as shown in FIGS. 5 to 7B will also support avoiding contact with the rotating disk 180 surface. The central rail height 64 will also supporting avoiding contact with the disk 180 surface when the disk drive 110 parks the actuator assembly 158.

Preferably, the left deflection rail height 54 may be essentially equal to the right deflection rail height 74. Further, these heights 54 and 74 may be essentially equal to the depth D2 of the leading air bearing surface 4. Alternatively, these heights 54 and 74 may be greater than D2. Further alternatively, these heights 54 and 74 may be less than D2. These heights 54 and 74 may further be essentially equal to D2 minus D1.

As used herein, two quantities are essentially equal if they are refer to the same kind of quantity and are within manufacturing tolerances of each other. By way of example, height and depth may be the same kind of quantity. Manufacturing tolerances, unless otherwise stated, will be within ten percent.

Alternatively, the left deflection rail height 54 may differ from the right deflection rail height 74. One of these heights 54 and 74 may be essentially equal to the depth D2 of the leading air bearing surface 4. One of these heights 54 and 74 may be greater than D2. One of these heights 54 and 74 may be less than D2. One of these heights 54 and 74 may be essentially equal to D2 minus D1.

The height 64 of the central deflection rail 60 may be greater than at least one of the deflection rail heights 54 and 74. The central deflection rail height 64 may be essentially equal to at least one of the deflection rail heights 54 and 74. The central deflection rail height 64 may be essentially equal to both the deflection rail heights 54 and 74. The central deflection rail height 64 may be essentially equal to the depth D2 of the leading air bearing surface 4. The central deflection rail height 64 may be greater than the depth D2. The central deflection rail height 64 may be less than the depth D2. Further, the central deflection rail height 64 may be essentially equal to D2 minus D1.

Figure 8:
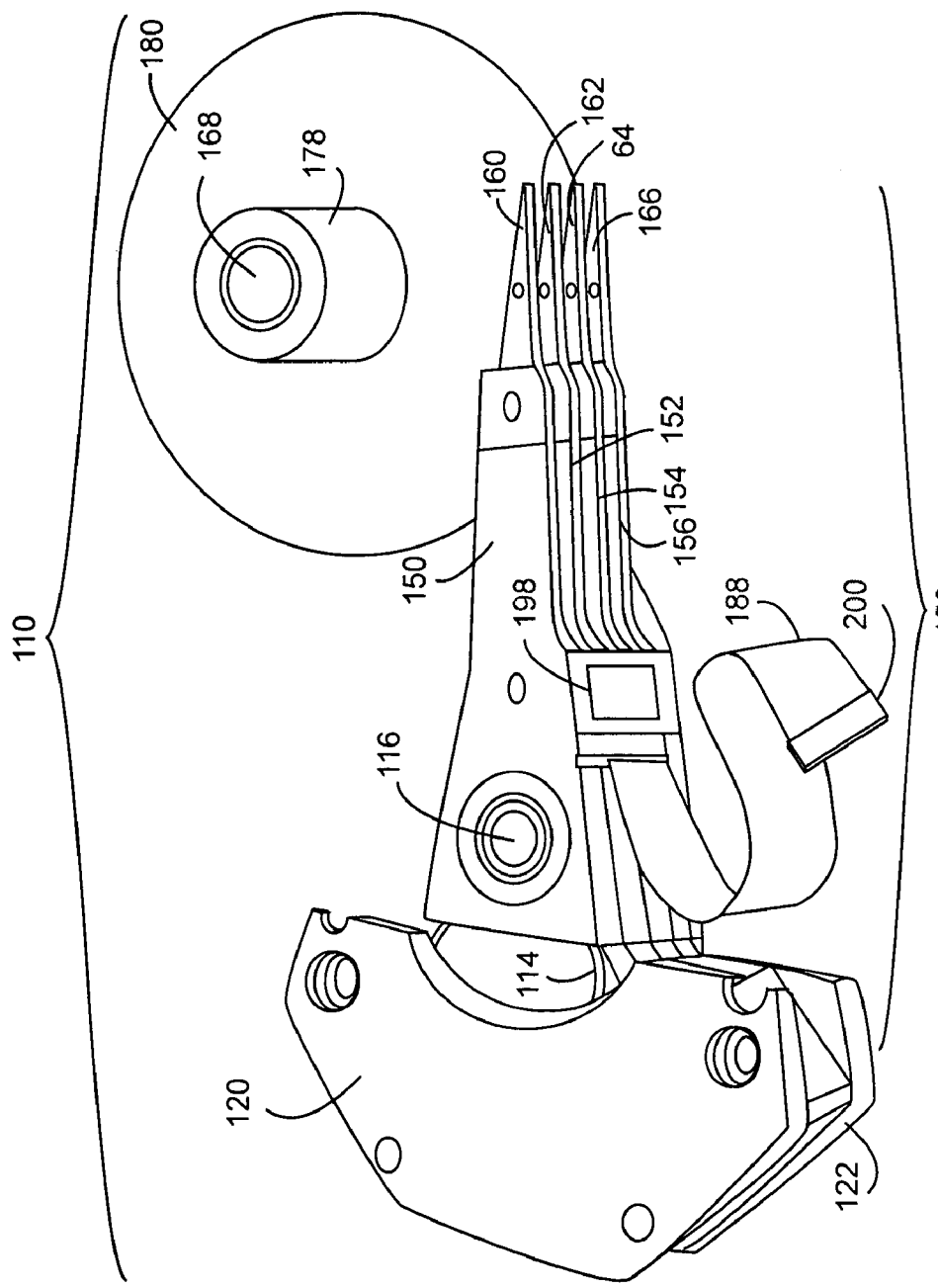
FIG. 8 shows an a hard disk drive 110 with the actuator assembly included in a voice coil motor assembly, containing actuator arms, positioning at least one head gimbal assembly.
Figure 9A:
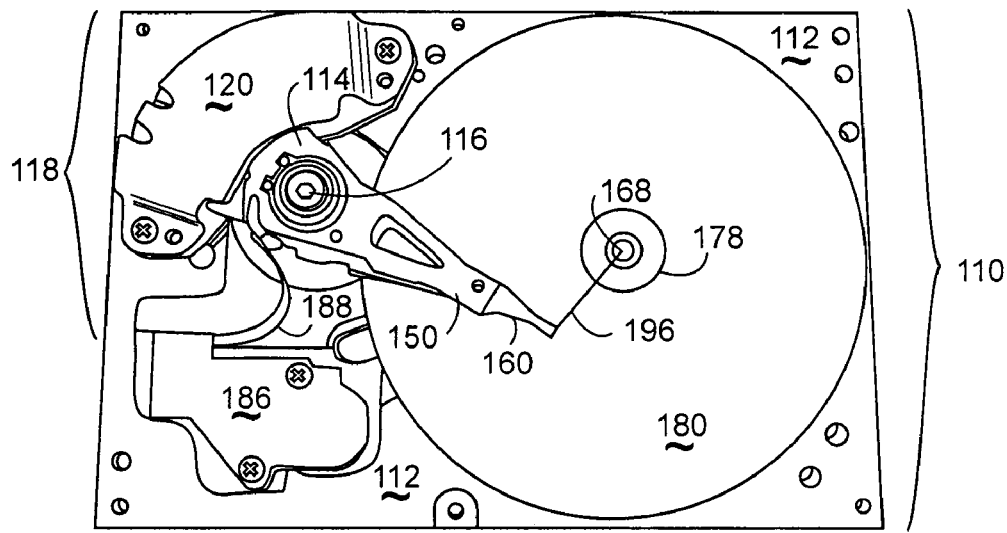
FIG. 9A shows a head disk drive including the voice coil motor assembly mounted through the actuator pivot to the disk base plate, coupling through the head gimbal assembly over a rotating disk surface.
Figure 9B:
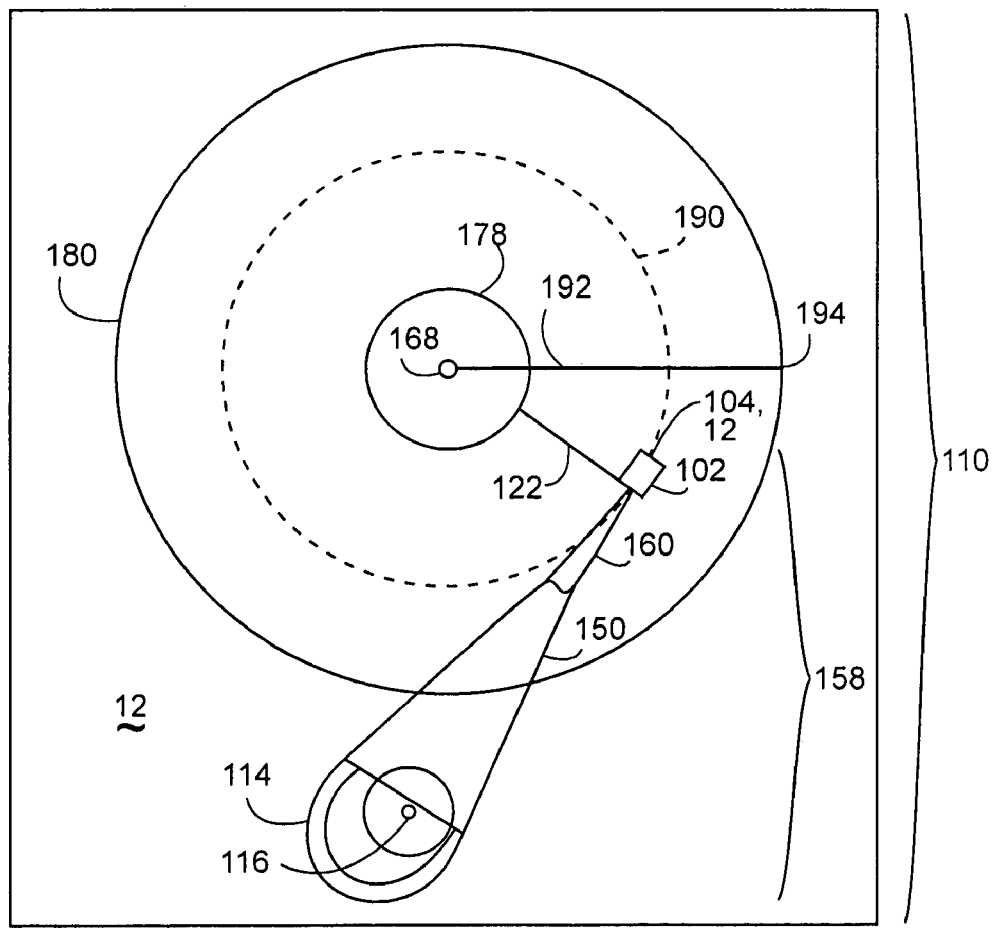
FIG. 9B shows a detail of FIG. 9A, where the actuator arm, coupling through the head gimbal assembly to position the slider to access a track on the rotating disk surface.
Figure 10:
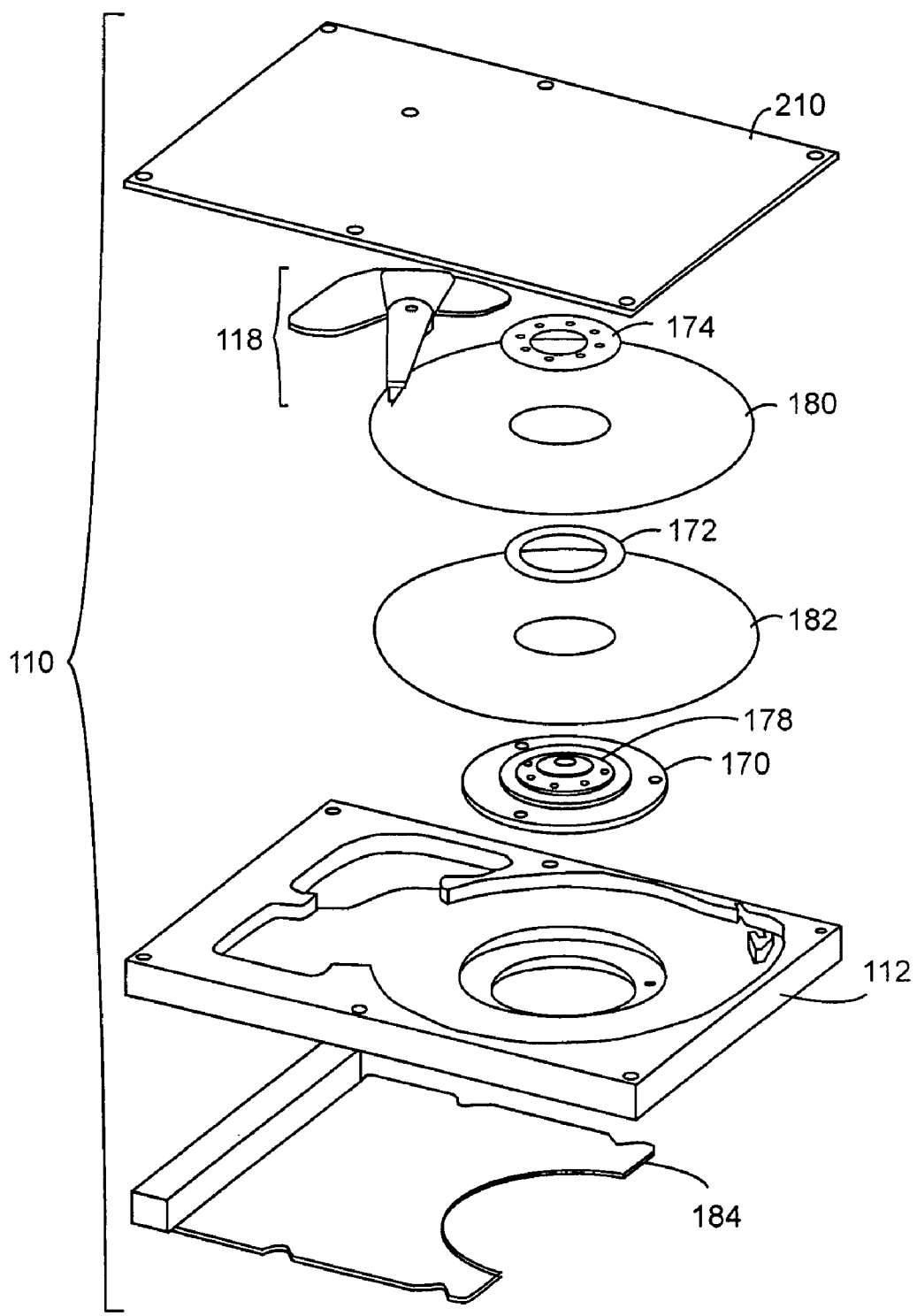
FIG. 10 shows a simplified, exploded view of the primary components of the hard disk drive using the voice coil motor assemblies of FIGS. G9 and 9A.

In certain embodiments of the invention, the distance D3 of FIG. 1B may typically be less than 15 nano-meters (nm) during normal access operations of the hard disk drive 110 of FIGS. 8 to 10. The distance D3 may further be less than 10 nm. The distance D3 may further be less than 5 nm. The distance D3 may further be less than 3 nm.

As shown in FIGS. 2A, F2B, 2B to 7B, the left deflection rail 50 and the right deflection rail 70 are preferably after the end of leading air bearing surface 4 and before the central island including region 14. The left deflection rail 50 and the right deflection rail 70 are preferably located around the principal axis 24.

Each of the deflection rails 50, 60, 70, 250 and 270 of FIGS. 2A to 7B, belong to the deflection rail collection as members. It may be preferred that at least one member of the deflection rail collection has a back face. It may further be preferred that each member of the deflection rail collection has a back face, as shown in the FIGS. 2A to 7A. By way of example, in these Figures, the left deflection rail 50 has a back face 50B. The central deflection rail 50 has a back face which is essentially parallel the leading edge 26. The right deflection rail 70 has a back face 70B in FIGS. 2A to 3B, and 5 to 7B. In FIGS. 4A and 4B, the back face of the right deflection rail 70 is bent, composed of a first back face 70B1 and a second back face 70B2, both of which are essentially straight.

It is preferred that the first gap G1 be sufficient that no additional sub-ambient pressure is generated when the slider 102 is in operation flying over the rotating disk 180 surface. It is further preferred that the gaps G1, G2, and G3, of FIGS. 5 and 6A, are all sufficient that no additional sub-ambient pressure is generated.

In FIGS. 4A and 4B, the left deflection rail 50 has a curved shape and the right deflection rail 70 has a bent shape. While it is not shown, one skilled in the art will recognize that the invention includes embodiments where the left deflection rail 50 is also a bent shape. Also not shown, the invention includes embodiments where the right deflection rail 70 is a curved shape.

The invention includes embodiments using more than three deflection rails, similar in operation and construction to the deflection rails shown in the FIGS. 6A to 6D.

Figure 6A:
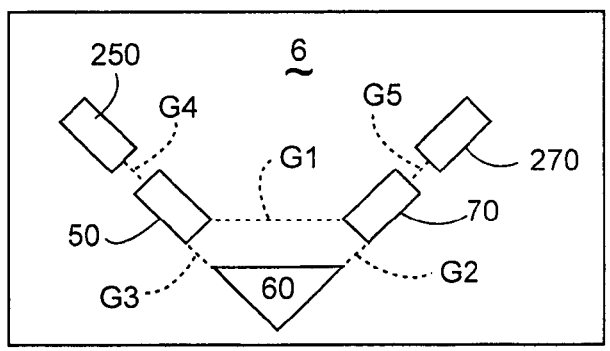
FIG. 6A shows a refinement of FIG. 5, further including a second left deflection rail and a second right deflection rail.

FIG. 6A shows a refinement of FIG. 5, further including a second left deflection rail 250 and a second right deflection rail 270.

Figure 6B:
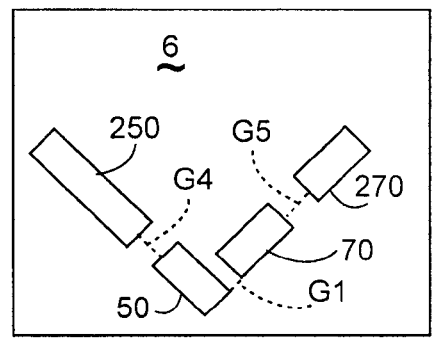
FIGS. 6B to 6C shows refinements of FIGS. 2A and 2B, further including a second left deflection rail and a second right deflection rail.
Figure 6C:
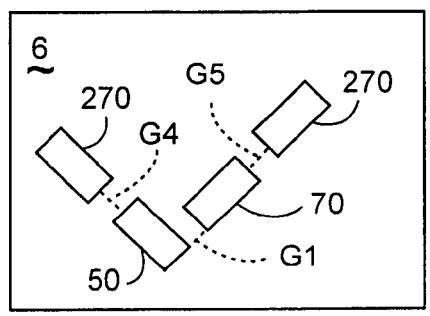

FIGS. 6B to 6C shows refinements of FIGS. 2A and 2B, further including a second left deflection rail 250 and a second right deflection rail 270.

Figure 6D:
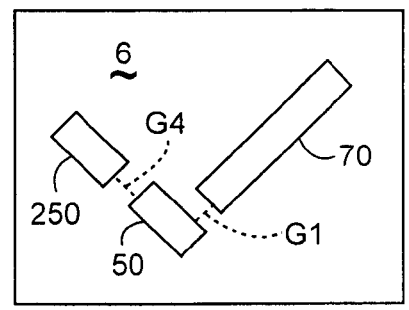
FIG. 6D shows a refinement of FIGS. 2A and 2B, further including a second left deflection rail.

FIG. 6D shows a refinement of FIGS. 2A and 2B, further including a second left deflection rail 250.

In FIGS. 6A to 6D, a fourth gap G4 separates the second left deflection rail 250 from the left deflection rail 50. In FIGS. 6A to 6C, a third gap G3 separates the second right deflection rail 270 from the right deflection rail 70.

Figure 7C:
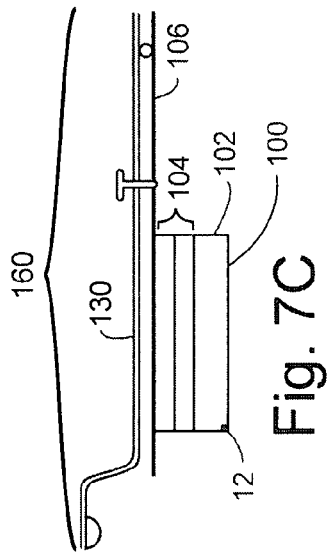
FIG. 7C shows a head gimbal assembly including a slider presenting the air bearing surface of FIGS. 2A to 7B.

FIG. 7C shows a head gimbal assembly 160 including a slider 102 presenting the air bearing surface 100 and the read-write head 12. The slider 102 electrically couples to a flexure 106. The flexure 106 couples to a load beam 130. The head gimbal assembly may further, preferably include at least one micro-actuator 104. The coupling of the slider 102 to the flexure 106 may involve coupling through the one or more micro-actuators 104.

FIG. 8 shows a hard disk drive 110 with actuator assembly 158 included in a voice coil motor assembly 118, containing actuator arms 150 to 156 which positions at least one head gimbal assembly 160 to 166.

FIG. 9A shows a head disk drive 110, including the voice coil motor assembly 118 mounted through the actuator pivot 116 to the disk base plate 112. The voice coil motor assembly 118, couples through the head gimbal assembly 160, to position the read-write head 12 over a rotating disk 180 surface.

FIG. 9B shows a detail of FIG. 9A. The actuator arm 150, coupling through the head gimbal assembly 160, positions the slider 102. The read-write head 12 accesses a track 190 on the rotating disk 180 surface.

FIG. 10 shows a simplified, exploded view of the primary components of the hard disk drive 110 using the voice coil motor assemblies 118 of FIGS. G9 and 9A.

Consider the actuator arms 150 to 156 of FIGS. 8, 9A, and 9B. each of the actuator arms 150 to 156, contain at least one head gimbal assemblies 160 to 166. As shown in FIG. 7C, each of the head gimbal assemblies 160 may use the sliders 102 of FIGS. 2A to 7B. The actuator assembly 158 includes the voice coil 114 rigidly coupled with at least one actuator arm 150 and collectively pivoting about the actuator pivot 116, as in FIG. 9B.

The voice coil motor assembly 118 includes the actuator assembly 158, a top yolk plate 120 and a bottom yolk plate 122, as shown in FIG. 8. The top yolk plate 120 rigidly couples over a top fixed magnet. The bottom yolk plate 122 rigidly couples to a bottom fixed magnet. The top and bottom fixed magnets are not visible in this Figure. The hard disk drive 110 is made in part by mounting the actuator assembly 158 through actuator pivot 116 to the disk base plate 112, as shown in FIG. 9A. The read-write head 102 is positioned over a track 190 on a rotating disk 180 surface as in FIG. 9B, by electrically stimulating the voice coil 114. The electrical stimulation of the voice coil 114 magnetically interacts with the fixed magnets coupled to the top and bottom yolk plate 120 and 122 to move the actuator arm 150 by lever action through the actuator pivot 116. The rotating disk 180 creates by friction a wind which is used by the air bearing surface to fly the slider 102. The read-write head 12 flies over the track 190 a small distance D3 off the rotating disk 180 surface, as in FIG. 1B.

In certain embodiments of the invention D3 is less than 15 nano-meters (nm). In certain further embodiments, D3 may be less than 10 nm. D3 may further be less than 5 nm. D3 may further be less than 3 nm.

Those skilled in the art will appreciate that various adaptations and modifications of the described preferred embodiments may be configured without departing from the scope of the invention. Therefore, it is understood that, within the scope of the appended claims, the invention may be practiced other than as specifically described herein.

What is claimed is:

1. A slider including an air bearing surface, comprising:
    a deflection rail collection comprises a left deflection rail and a right deflection rail separated by a first gap of greater than zero distance, and a central deflection rail,
    each member of said deflection rail collection resides in a negative pressure pocket formed between a leading air bearing surface and a central island containing a read-write head;
    wherein each member of said deflection rail collection includes a front face at an angle to the principal axis of said slider to aid deflecting an incoming particle away from said central island, whenever said slider is in operation.

2. The slider of claim 1, wherein said first gap provides means for diminishing said negative air pressure in said negative pressure pocket.

3. A hard disk drive, comprising:
    a disk base plate;
    a spindle motor mounted on said disk base plate and coupled to at least one disk to create a rotating disk surface;
    a voice coil motor assembly including said slider of claim 1, with said voice coil motor assembly mounted on said disk base plate by an actuator pivot to move said slider including said air bearing surface facing said rotating disk surface to position said read-write head to access a track on said rotating disk surface, with said deflection rail collection members collectively configured to reduce particle contamination problems at an interface between said read-write head and said rotating disk surface.

4. The hard disk drive of claim 3, wherein said slider flies within a distance D3 of said rotating disk surface while said read-write head accesses said track, and said distance D3 is less then fifteen nanometers.

5. The hard disk drive of claim 4, wherein said distance D3 is less than ten nano-meters.

6. The hard disk drive of claim 5, wherein said distance D3 is less than five nano-meters.

7. The hard disk drive of claim 6, wherein said distance D3 is less than three nano-meters.

* * * * *